United States Patent

Lussow et al.

[15] 3,639,143

[45] Feb. 1, 1972

[54] ELECTROLESS NICKEL PLATING ON NONCONDUCTIVE SUBSTRATES

[72] Inventors: Robert O. Lussow, Wappingers Falls; Louis H. Wirtz, Poughkeepsie, both of N.Y.

[73] Assignee: International Business Machines Corporation, Armonk, N.Y.

[22] Filed: Feb. 19, 1969

[21] Appl. No.: 800,597

[52] U.S. Cl. ..........................117/54, 117/47 R, 117/160 R

[51] Int. Cl. ..................................B44d 1/092, C23c 3/02

[58] Field of Search ...............................117/47 R, 160, 54

[56] References Cited

UNITED STATES PATENTS

| | | | |
|---|---|---|---|
| 3,075,856 | 1/1963 | Lukes | 117/160 R |
| 3,212,918 | 10/1965 | Tsu et al. | 117/160 R |

*Primary Examiner*—Alfred L. Leavitt

*Assistant Examiner*—Janyce A. Bell

*Attorney*—Hanifin and Jancin and Henry Powers

[57] ABSTRACT

A process for electroless deposition of uniform and consistent dense nickel films on nonconductive substrates utilizing conventional techniques. The process requires at least two repetitive cycles of activation, electroless plating of nickel and heating.

8 Claims, 1 Drawing Figure

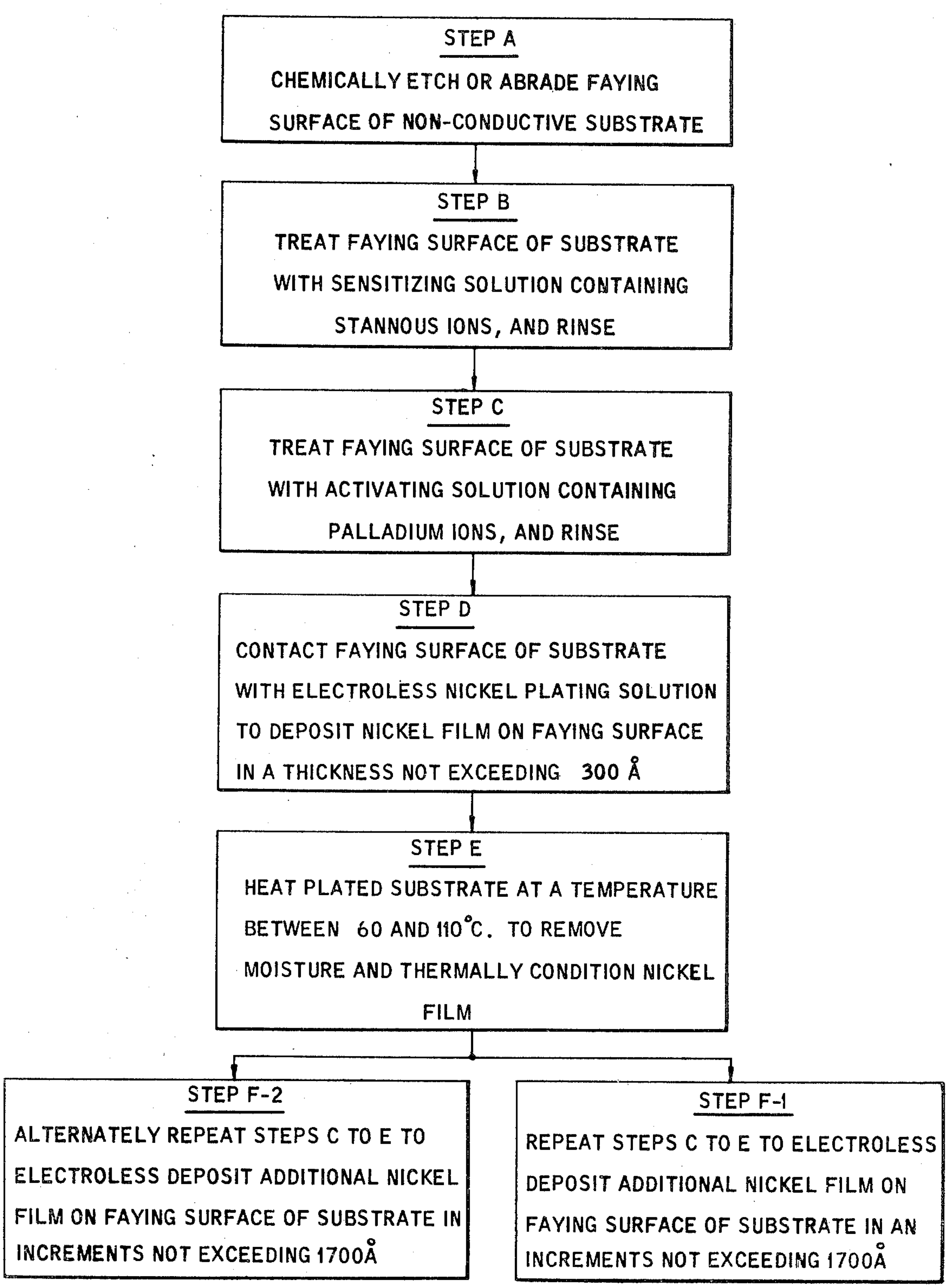
INVENTORS
ROBERT O. LUSSOW
LOUIS H. WIRTZ
BY Henry Powers
ATTORNEY

ELECTROLESS NICKEL PLATING ON NONCONDUCTIVE SUBSTRATES

FIELD OF THE INVENTION

This invention relates to electroless plating of nickel on nonconductive substrates, and more particularly to deposit thick cohesive coatings of nickel thereon.

THE PRIOR ART

The electroless deposition of metal on nonconductive substrates is an extensively known and widely employed technique. Typical processes for the electroless deposition of metal on nonconductive substrates are described in U.S. Pat. Nos. 3,212,917, 3,212,918 and 3,379,556 wherein is also included the deposition of electroless nickel on nonconductive substrates to which this invention is directed.

Typically for electroless deposition of nickel on a nonconductive substrate of glass, ceramic, plastic, paper, wood and the like, the substrate is initially sensitized by dipping it in an aqueous acidic solution of stannous chloride, rinsing the substrate followed by activating the substrate by dipping it in an aqueous acidic solution of palladium chloride and subsequent immersion of the substrates in an electroless nickel plating solution which normally comprises (a) a source of nickel ions usually nickel sulphate or nickel chloride, (b) a reducing agent therefor such as formaldehyde, Fehling's solution and the like, (c) an alkali which generally is an alkali metal hydroxide such as sodium hydroxide, and (d) a complexing agent for the nickel such as ethylenediaminetetracetic and to prevent precipitation of the nickel in solution. Following the deposition of the nickel, the plated substrate is rinsed and baked to drive out any moisture in the final product.

Regardless the extensive commercial use of the electroless plating technique, it is for the most part limited to applications requiring only thin film of the plated metal. The process, however, not found any practical success in applications requiring relatively thick film of the order of 400 to 1,300 angstroms of the electrolessly deposited metal on nonconductive substrates, as for example an electrolessly deposited film of nickel of the order of 500 angstroms on glass intended for photochemical fabrication into a photomask in the manufacture of semiconductor device where such photomask is used to expose a thin film of photosensitive material previously deposited on a wafer of semiconduction material in which miniaturized semiconductor devices are to be constructed.

Typical disadvantages characterizing the electroless plating process in the deposition of relatively thick films of nickel on nonconductive substrates, include coatings of unsatisfactory integrity and/or adherence, and spalling and/or "orange peeling" of the coating.

Recognition of some of these inherent disadvantages of the electroless plating processes may be found in the above-noted patents together with various proposed solutions which though minimize these disadvantages do not, however, eliminate them. For example, in the above-noted U.S. Pat. No. 3,212,912, it is proposed to deposit the nickel on the substrate in increments of 200 angstroms by repetitive steps of immersing the substrate in the electroless plating solution and baking.

Although thick and adherent films of nickel can be deposited on glass substrates in accordance with this patent which may be suitable for use in magnetic storage elements, it was found that the formation of nickel films was inconsistent and nonuniform which precludes their use in fabrication of photomasks.

SUMMARY OF THE INVENTION

It has now been discovered that uniform and consistent dense films of nickel may be electrolessly deposited on substrates in thickness up to 1,300 angstroms and higher and particularly on glass plates to provide optical densities as high as 4 and higher by sensitization of the substrates, and alternately activating, electrolessly nickel-plating and heating the deposited increments of nickel until the desired thickness of the film is obtained.

Accordingly, it is an object of this invention to provide an improved method of electroless plating of nickel on nonconductive substrates.

It is also an object of this invention to provide an improved method for electroless deposition of uniform and consistent dense coatings of nickel on nonconductive substrates utilizing conventional electroless plating technique.

The foregoing and other objects, features, and advantages of the invention will be apparent from the following more particular description of a preferred embodiment of the invention, as illustrated in the accompanying drawing.

BRIEF DESCRIPTION OF THE DRAWING

In the accompanying drawing, the single FIGURE is a flow chart of the steps of a preferred process of this invention.

DESCRIPTION OF THE PREFERRED EMBODIMENT

In accordance with the present invention utilizing conventional electroless nickel-plating techniques nonconductive substrates are preconditioned by suitable cleaning and etching where the substrates have exceptionally smooth surfaces such as glass whose surface is preferably "devitrified" or microscopically roughed. For this preconditioning treatment, the cleaning may be effected by conventional cleaning agents such as hot chromic acid, detergents, sodium hydroxide, peroxides, permanganates, gaseous oxidents, and nitric acid. A convenient and effecting cleaning solution is also commercially available under the trademark "Enthone Conditioner No. 470."

After the cleaning step, the substrates are rinsed in deionized water and preferably by stream rinsing. In the case of exceptionally smooth surfaced substrates as glass, they are immersed for 1 to 2 minutes in a mild buffered HF solution maintained at room temperature and having the following composition A:

150 cc. of aq. 49% HF
50 cc. of aq. 40% $NH_4F$
4,000 cc. of deionized water

Following the etching step, the substrates, and particularly the glass plates of the specific embodiment are again rinsed at room temperature in deionized water.

After preconditioning the substrates are immersed in a suitable sensitizer solution of materials which are readily oxidized and may typically include $SnCl_2$, $Sn(BF_4)_2$, $TiCl_3$, $HBF_4$ and the like to which may be added hydrochloric acid, sulfuric acid, sodium hydroxide, ammonium hydroxide and the like for adjustment of the pH for the specific sensitizer employed. For glass plates of a specific embodiment, sensitizer solution A had the following composition B:

$SnCl_2 \cdot 2H_2O$ 70 g.
aq. HCl (37.0–38.0 percent conc.) 40 cc.
deionized water 960 cc.

Alternatively for convenience, the sensitizer may be prepared by admixing a commercial sensitizer, sold under the trademark "Enthone Sensitizer No. 432," with water in a ration of 1 to 15.

The sensitized substrates are again stream rinsed in water at room temperature prior to immersion activator solutions which are well known in the art, and which typically include salts of noble metals such as platinum, palladium, gold, and silver. A typical activator solution as employed with the glass plates of the specific embodiment had the following composition C:

$PdCl_4$ 0.1 g.
aq. HCl (37–38 percent conc.) 1.0 cc.
deionized water 1,000 cc.

Alternatively the activator may also be conveniently prepared by admixing with water a commercially available product sold under the trademark "Enthone Activator No. 440" in the ratio of 1 to 15.

Following rinsing of the sensitized substrates, they are subjected to alternate treatments of activation in solutions such as indicated above, electroless plating of nickel and heating to remove moisture from the deposited nickel film and thermal conditioning thereof. More specifically for the sensitized glass substrates of the specific embodiment, the activating solution was maintained at room temperature and comprised of palladium chloride, hydrochloric acid and water in the particular concentrations noted in the specific composition C thereof above.

Following activation of the substrates, they are again stream rinsed in deionized water at room temperature and immersed in any conventional electroless nickelplating solution which normally comprises (a) a source of nickel ions such as nickel sulphate and nickel chloride, (b) a reducing agent such as formaldehyde and Fehling's solution, (c) an alkali such as sodium hydroxide and ammonium hydroxide to provide the desired pH, and (d) a complexing agent, such as ethylenediaminetetracetic acid, for nickel to prevent precipitation thereof in solution.

A specific bath utilizes for electroless plating of nickel on glass, of the specific embodiment, had the following composition D:

| | |
|---|---|
| $NiSO_4 \cdot H_2O$ | 35 grams |
| Sodium Citrate | 10 grams |
| Sodium hypophosphite | 15 grams |
| Sodium acetate | 10 grams |
| Magnesium sulfate | 20 grams |
| Deionized water | 1,000 cc. |
| "Duponal C" (1% Sodium lauryl sulfate) | 10 cc. |
| pH 10.2 | |

In a typical example utilizing activated glass plates, they were immersed for about 1 to about 2 minutes in the above-noted specific plating solution D maintained at a temperature between about 22° to about 28° C. In electroless nickelplating of glass for fabrication of photomasks used in semiconductor processing, required thicknesses are normally determined by resultant optical density which for the first increment of nickel deposited will range up to a maximum of 0.7, and preferably within the range of 0.5 to 0.7. In general, however, for nickelplating of nonconductive substrates for use in other application, the first increment of nickel film deposited will be limited, by appropriate duration of immersion, to a maximum thickness about 300 A (angstroms), and preferably within the range of about 180 to about 240 A. Accordingly, as is to be understood, substantially any nonconductive substrate may be plated in accordance with the process of this invention as for example glass, ceramics, plastics, paper, wood, leather and the like.

In any event the nickelplated substrates are stream rinsed in deionized water at ambient temperatures, then blown dry with an inert gas such as nitrogen and heated from about 20 to about 60 minutes at between 50° to 130° C. and preferably from about 60° to about 100° C. in an oven, and preferably in a vacuum. Heating of the plated substrates serves to not only remove moisture from the samples but also manifests a thermal conditioning of the deposited nickel film which is hypothized to involve stress relieving and/or partial annealing of the metal.

Following the heat treatment of the plated substrates, the activation, plating and heating cycle is repeated at least once until the desired thickness of nickel film is obtained which normally may range up to 2,000 angstroms or more. However, the thickness of each increment of nickel deposited is limited to a maximum of 1,700 angstroms, and preferably from about 200 to about 1,000 angstroms.

In the electroless depositing of nickel on glass plates for the indicated use as photomasks, it was found that only one additional cycle of activation plating and heating was required to obtain an additional increment of deposited nickel film to provide an optical density of about 1.5. Normally, however, it was found that the total thickness of electroless deposited nickel which provides an optical density of about 1.5 to about 4.0 was sufficient to provide nickel coated glass plates suitable for fabrication of the indicated photomasks.

Set forth below in summary, is one specific processing schedule set forth above for electroless plating of nickel on glass substrates for use in fabrication of the indicated photomasks:

A. Preconditioning
1. Stream rinse in Di (deionized) water
2. Clean for 0.5 hour at 60° C. in a cleaning solution composed of 35 cc. of 28–30 percent $NH_4OH$, 965 cc. deionized water and 80 cc. of 50 percent $H_2O_2$.
3. Stream rinse in DI water
4. Etch for 1½–2 minutes in buffered HF solution A as above.
5. Stream rinse in DI water B. Sensitization
1. Immerse for 1 minute at 25° C. in stannous chloride solution as composition B above
2. Stream clean in DI water C. Activation
1. Immerse for 1 minute at 25° C. in palladium chloride solution as composition C above.
2. Stream rinse in DI water D. Electroless plating
1. Immerse (as above) for 2 minutes at 25°±3° C. in above composition D electroless nickelplating solution 10.2 pH to an optical density of 0.7
2. Stream rinse in DI water E. Thermal treatment
1. Blow dry with nitrogen
2. Heat in slight vacuum, 100 millitorr, at 50°–80° C. for 30 minutes F. Post Treatment
1. Repeat Steps B, C, and D above
   a. Immersion in plating solution maintained for 8 minutes to provide nickel deposit giving overall optical density of 1.5–2.0.

Thus, while the invention has been particularly shown and described with reference to the preferred embodiments thereof, it will be understood by those skilled in the art that the foregoing and other various changes in form and details may be made therein without departing from the spirit and scope of the invention.

What is claimed is:

1. In a method of electroless plating of nickel on a nonconductive substrate wherein said substrate is sensitized, activated and plated with nickel in an electroless plating solution thereof, the improvement comprising:
   a. restricting the deposition of said nickelplating to a thickness in the range of about 180 to about 240 angstroms,
   b. heating said plated substrate at a temperature in the range of about 50° to about 130° C. to remove moisture therefrom and to heat condition said plating;
   c. reactivating the resultant plated substrate of step (b); and
   d. reelectroless plating the substrate of step (c) with nickel in an electroless plating solution thereof with an additional thickness of nickel not exceeding an increment of about 1,300 angstroms.

2. The method of claim 1 including alternately repeating steps *a* to *d* thereof as required to obtain a preselected total thickness of said nickelplating not in excess of 240 angstroms.

3. The method of claim 1 wherein said substrate is glass.

4. A process of electroless plating comprising
   a. chemically etching a surface of a nonconductive substrate;
   b. treating said surface with a stannous chloride sensitizer solution followed by rinsing thereof;
   c. treating said surface with a palladium chloride activator solution followed by rinsing thereof;

d. contacting said surface with electroless nickelplating solution to deposit said nickel on said surface in a thickness restricted within a range of about 180 to about 300 angstroms followed by rinsing thereof; and e. repeating steps *c* and *d* above to plate an additional thickness of nickel on said surface in an increment restricted in the range of about 300 to about 1,300 angstroms.

5. The method of claim 4 wherein said substrate is glass.

6. The method of claim 4 including alternately repeating steps *c* to *d* thereof to plate additional thickness of nickel on said surface in increments restricted in the range of about 200 to about 1,000 angstroms.

7. A method for electroless plating of nickel on transparent nonconductive substrate comprising:

a. chemically etching a major surface of said substrate;

b. treating said surface of said substrate with a sensitizing solution containing stannous ions, followed by rinsing thereof;

c. treating said surface with an activating solution containing palladium ions followed, by rinsing thereof;

d. contacting said surface with an electroless nickelplating solution to deposit said nickel on said surface in a thickness restricted within a range of about 150 to about 240 angstroms;

e. heating said substrate in the range of about 60° to about 100° C. to remove moisture therefrom and thermally condition said nickel deposit; and f. repeating steps (c) to (e) above to plate an additional thickness of nickel on said surface by an increment restricted in the range of about 300 to about 1,300 angstroms.

8. A method of electroless plating of nickel on a transparent nonconductive substrate adapted for photochemical fabrication of photomasks for use in the manufacture of semiconductor elements comprising:

a. chemically etching a major surface of said substrate for devitrification thereof;

b. treating said surface with a sensitizing solution containing stannous ions followed by rinsing thereof;

c. treating said surface with an activating solution containing palladium ions followed by rinsing thereof;

d. contacting said surface with an electroless nickelplating solution to deposit a nickel film in a thickness defining an optical density in the range of about 150 to about 245 relative to said substrate;

e. heating said substrate in the range of about 60° to about 100° C. to remove moisture therefrom and thermally condition said nickel film deposit;

f. repeating steps (c) to (e) above to deposit an additional thickness of nickel film on said surface to increase the optical density by an increment within the range of about 300 to about 1,300.

* * * * *